United States Patent [19]
Durigon et al.

[11] 3,869,610
[45] Mar. 4, 1975

[54] METHOD OF DETERMINING THE AMOUNT OF AN ISOTOPIC MIXTURE OF NOBLE GASES PRESENT AS A TAG IN A NUCLEAR REACTOR FUEL ELEMENT

[75] Inventors: Docile D. Durigon, North Huntington; Richard C. Deklever, Monroeville, both of Pa.

[73] Assignee: The United States of America as represented by the United States Atomic Energy Commission, Washington, D.C.

[22] Filed: Jan. 8, 1974

[21] Appl. No.: 431,820

[52] U.S. Cl. ............... 250/303, 250/302, 250/304
[51] Int. Cl. ............................................. G21h 5/02
[58] Field of Search ............ 250/252, 302, 303, 304

[56] References Cited
UNITED STATES PATENTS 3,227,878   1/1966   Nairn et al. ..................... 250/304
3,230,368   1/1966   Chleck .............................. 250/304
3,597,611   8/1971   Harman et al. ................... 250/303

*Primary Examiner*—Archie R. Borchelt
*Attorney, Agent, or Firm*—John A. Horan; Arthur A. Churm; Frank H. Jackson

[57] ABSTRACT

A predetermined small amount of krypton-85 is added to an isotopic mixture employed as a tag to identify a failed fuel element before this mixture is inserted into the void volume of the fuel element. The exterior of the plenum is gamma scanned and the reading obtained compared with the reading obtained by gamma scanning an element of the same configuration known by destructive examination to have contained an effective amount of isotopic mixture.

2 Claims, No Drawings

3,869,610

METHOD OF DETERMINING THE AMOUNT OF AN ISOTOPIC MIXTURE OF NOBLE GASES PRESENT AS A TAG IN A NUCLEAR REACTOR FUEL ELEMENT

CONTRACTUAL ORIGIN OF THE INVENTION

The invention described herein was made in the course of, or under, a contract with the U.S. Atomic Energy Commission.

BACKGROUND OF THE INVENTION

This invention relates to a method of determining the amount of an isotopic mixture of noble gases present as a tag in a nuclear reactor fuel element. In more detail, the invention relates to a method of determining that a fuel element for a nuclear reactor has present therein an effective amount of a mixture of noble gas isotopes to enable identification of a fuel assembly containing a failed fuel element.

A number of different techniques have been developed for identifying failed fuel elements in an operating nuclear reactor. According to one of these techniques, different fuel elements are tagged with different mixtures of gaseous isotopes so that each subassembly contains a different identifiable mixture of isotopes. The use of xenon isotopes having a mass number from 124 to 130 for this purpose is described in U.S. Pat. No. 3,663,363, dated May 16, 1972, to Carl E. Crouthamel, et al. Other noble gas mixtures such as mixtures of neon isotopes or mixtures of stable isotopes of krypton in helium may also be employed. Presently, a 1 ± 0.25 ml addition of a unique isotopic blend of xenon in helium is required in each hermetically sealed unencapsulated experimental element to be placed in EBR-II — the Experimental Breeder Reactor No. 2. This mixture will be liberated to the reactor cover gas in the event a cladding failure occurs and the cover gas can then be tested to identify the xenon isotopes present therein and thereby the fuel assembly which has failed.

The isotopic mixture may be inserted into a fuel element during manufacture by any of the following techniques:

1. Cryogenic cooling of the fuel element to transfer the isotopic mixture from a standard volume and pressure, then sealing the fuel element.

2. A direct pressurization of the isotopic mixture into the fuel element.

3. Insertion of a capsule containing the isotopic mixture into the fuel element, then rupturing this capsule during or after sealing the fuel element. It is, of course, necessary that the fuel elements contain at least the minimum quantity of isotopes required for identification of the isotopes in the reactor cover gas. However, destructive testing has shown variations in the quantity of isotopic mixture present in the fuel elements after handling and sealing. These discrepancies occurred due to several factors:

1. Differences in partial pressure between the xenon contained within the fuel element and helium surrounding the fuel element results in gas losses via diffusion.

2. Gaseous convection currents caused by removing the tagging apparatus resulted in additional xenon gas loss.

3. Leaking seals and valves caused insufficient xenon additions to the internal fuel element void volume using the "evacuate-backfill" concept during the gas transfer, thus resulting in insufficient xenon content within the hermetically sealed elements.

Since destructive testing is not feasible on non-development fuel elements, a rapid and positive nondestructive test is needed to test for minimum xenon and/or krypton content.

Since the isotopes employed are not radioactive, gamma scanning cannot be employed to directly determine the quantity of isotopes hermetically sealed within the fuel element, nor are any other simple direct techniques known to accomplish this.

SUMMARY OF THE INVENTION

According to the present invention, a predetermined small amount of krypton-85 is added to an isotopic mixture employed as a tag before the isotopic mixture is inserted into the void volume of a fuel element. Gamma scanning of the void volume of the fuel element is a rapid and relatively inexpensive method of determining the amount of krypton-85 present in the fuel element. Results of the gamma scan can be compared with results of a gamma scan of an element of the same configuration known to contain krypton-85 plus an effective amount of an isotopic mixture. If the gamma scan shows as much krypton-85 as is present in the standard, the fuel element will contain an effective amount of isotopic mixture.

SPECIFIC EMBODIMENT OF THE INVENTION

The first step in carrying out the method of the present invention is the preparation of a standard. Sufficient krypton-85 is added to a mixture of noble gas isotopes such as one of the mixtures described in the above-identified patent to provide between 1.0 and 5.0 microcuries of krypton-85 per inch of void volume and this mixture inserted into the plenum of a dummy fuel element of the same configuration as the fuel elements to be tested. The element is sealed by welding and a 1 inch section of the plenum gamma scanned for krypton-85 using a collimated NaI detector having a detectable sensitivity of < 0.05 microcuries per inch to obtain a reading in counts per minute convertible to microcuries. The element is then destructively examined by puncturing the fuel element, collecting all the gas from the plenum and analyzing the gas by mass spectrometry to determine the exact amount of krypton-85 present. This affords a correlation between the reading obtained by the gamma scan and the exact amount of krypton-85 present in the assembly.

The fuel elements are then prepared using conventional techniques except that enough krypton-85 is included in the isotopic mixture employed as tag to provide between 1.0 and 5.0 microcuries of krypton-85 per inch of fuel element void volume. A 1 inch section of the plenum of each fuel element is then gamma scanned and the result compared with the result obtained by gamma scanning a standard known by destruction examination to contain an effective amount of the isotopic mixture. The concentration of isotopic gas mixture in each fuel element can be determined by a simple proportion.

[Conc. in cc of isotopic gas mixture (standard)/
  Conc. in microcuries of $Kr_{85}$ (standard)] =
[Conc. in cc of isotopic gas mixture (fuel element)/
  Conc. in microcuries of $Kr_{85}$ (fuel element)].

The embodiments of the invention in which an exclusive property or privilege is claimed are defined as follows:

1. A method of determining that a fuel element for a nuclear reactor has present therein an effective amount of a mixture of different isotopes of the noble gases for detection of a fuel element failure comprising incorporating sufficient kypton-85 in the isotopic mixture before injecting the isotopic mixture into the plenum of the fuel element to provide between 1.0 and 5.0 microcuries of krypton-85 per inch of plenum in the fuel element, sealing the fuel element, gamma scanning the outside of the plenum to obtain an indication of the amount of krypton-85 present therein and comparing said indication with a similar gamma scan of an element of the same configuration known to have contained an effective amount of krypton-85.

2. The method of claim 1 wherein the noble gas isotopes are isotopes of xenon.

* * * * *